United States Patent [19]
Bytzek et al.

[11] Patent Number: 5,156,573
[45] Date of Patent: Oct. 20, 1992

[54] SERPENTINE DRIVE WITH COIL SPRING-ONE-WAY CLUTCH ALATERNATOR CONNECTION

[75] Inventors: Klaus K. Bytzek, Schomberg; Jacek S. Komorowski, Bond Head, both of Canada

[73] Assignee: Litens Automotive Partnership, Woodbridge, Canada

[21] Appl. No.: 710,454

[22] Filed: Jun. 5, 1991

[51] Int. Cl.$^5$ .................. F16D 13/08; F16D 43/21; F16H 7/12

[52] U.S. Cl. .................... 474/74; 192/415; 192/106.2; 474/135; 474/903

[58] Field of Search .............. 474/70, 74, 170, 189, 474/238, 903, 135; 192/415, 106.2, 56 C

[56] References Cited

U.S. PATENT DOCUMENTS

| | | |
|---|---|---|
| 2,866,349 | 12/1958 | Heckethorn .................. 474/70 X |
| 2,885,896 | 5/1959 | Hungerford, Jr. et al. ......... 474/70 |
| 2,886,977 | 5/1959 | van Ausdall ................... 474/70 |
| 4,031,761 | 6/1977 | Fisher et al. ............... 474/170 X |
| 4,473,362 | 9/1984 | Thomey et al. ................ 474/135 |

Primary Examiner—Stephen J. Novosad
Attorney, Agent, or Firm—Cushman, Darby & Cushman

[57] ABSTRACT

A serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring and one-way clutch mechanism is disposed in operative relation between the alternator pulley and the hub structure for (1) transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof and (2) allowing the hub structure and hence the armature assembly to rotate at a speed in excess of the rotational speed of said alternator pulley when the speed of the engine output shaft is decelerated to an extent sufficient to establish the torque between said alternator pulley and said hub structure at a predetermined negative level.

16 Claims, 2 Drawing Sheets

SERPENTINE DRIVE WITH COIL SPRING-ONE-WAY CLUTCH ALATERNATOR CONNECTION

This invention relates to drive systems and more particularly to serpentine accessory drive systems for automotive vehicles.

Serpentine accessory drive systems have come into increasing use in automotive vehicles. A typical serpentine drive system includes a driving pulley on the output shaft of the internal combustion engine of the vehicle, a series of driven pulleys for the accessories and a poly-V belt trained about the driving and driven pulleys. An advantage of the serpentine drive is that, by providing an automatic belt tensioner on the belt, the accessories can be fixedly mounted.

Particularly where the engine is of the four-cylinder type, the driving pulley establishes a highly dynamic loading on the belt. This high dynamic loading is due to the variable torque output characteristics of such engines. Under this circumstance, the tensioner cannot accommodate all of the variable torque characteristics. The result is sometimes noise and decreased belt life due to instantaneous belt slippage. It has been proposed to provide an engine crank shaft decoupler in order to deal with the high dynamic belt loading. This solution, while effective, is costly since the decoupler must have a capacity generally equal to the system capacity. A need exists for a more cost effective manner of accommodating the high dynamic belt loading to reduce noise and preserve belt life.

It is an object of the present invention to fulfill the need expressed above. The invention is based upon the principle that, because the alternator accessory presents the highest inertia to the system but requires only a portion of the total capacity of the system, cost effectiveness can be achieved by providing a decoupler function between the alternator armature and the alternator pulley. The invention is further based upon the principle that cost effectiveness can be further enhanced by combining the decoupler function with a one-way clutch function. Accordingly, the objective can be obtained by providing a serpentine belt drive system for an automotive vehicle of the type which includes an internal combustion engine having an output shaft with a driving pulley fixed thereto and rotatable about an output shaft axis, a sequence of driven assemblies each having a driven pulley rotatable about an axis parallel with the output shaft axis and a serpentine belt mounted in cooperating relation with the driving pulley and with the driven pulleys in a sequence which corresponds with the sequence of the driven assemblies when related to the direction of movement of the belt to cause the driven pulleys to rotate in response to the rotation of the driving pulley. The sequence of driven assemblies includes an alternator assembly including a housing and an armature assembly mounted in the housing for rotation about an armature axis. A hub structure is carried by the armature assembly outwardly of the housing for rotation therewith about the armature axis, the pulley of the alternator assembly being mounted on the hub structure for rotational movement with respect to the hub structure about the armature axis. A coil spring and one-way clutch mechanism is operatively mounted between the alternator pulley and the hub structure for (1) transmitting the driven rotational movements of the alternator pulley by the serpentine belt to the hub structure such that the armature assembly is rotated in the same direction as the alternator pulley while being capable of instantaneous relative resilient rotational movements in either direction with respect to the alternator pulley during the driven rotational movement thereof and (2) allowing the hub structure and hence the armature assembly to rotate at a speed in excess of the rotational speed of the alternator pulley when the speed of the engine output shaft is decelerated to an extent sufficient to establish the torque between the alternator pulley and the hub structure at a predetermined negative level.

Another object of the present invention is the provision of a drive system of the type described which is simple in construction, effective in operation and economical to manufacture and maintain.

These and other objects of the present invention will become more apparent during the course of the following detailed description and appended claims.

The invention may best be understood with reference to the accompanying drawings wherein an illustrative embodiment is shown.

IN THE DRAWINGS

Figure 1:
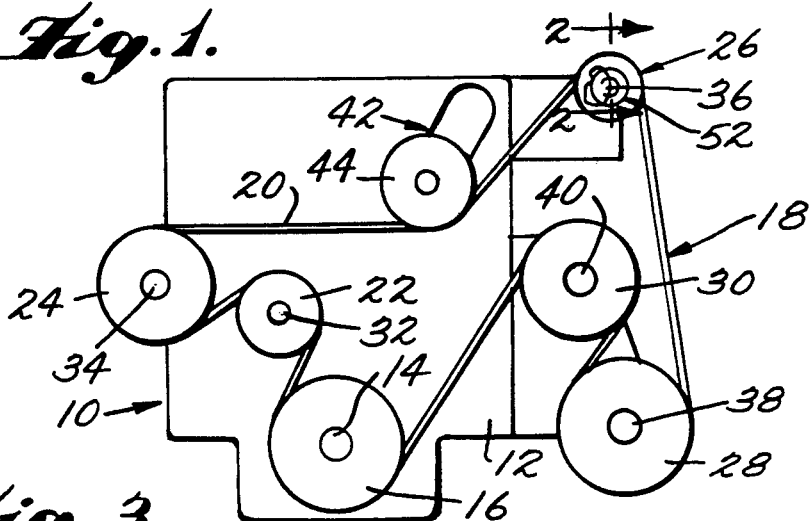
FIG. 1 is a front elevational view of an automotive internal combustion engine having a serpentine drive system embodying the principles of the present invention connected therewith.

Referring now more particularly to the drawings, there is shown in FIG. 1 an automotive internal combustion engine, generally indicated at 10, which includes a schematically indicated engine frame 12 and an output shaft 14. Fixed to the output shaft 14 is a driving pulley 16 forming a part of a serpentine drive system, generally indicated at 18. The drive system 18 includes an endless belt 20. The belt 20 is of the thin flexible type, as, for example, a poly-V belt. The belt 20 is trained about the driving pulley 16 and a sequence of driven pulleys 22, 24, 26, 28, and 30 each of which is fixed to respective shafts 32, 34, 36, 38, and 40. Except for the pulley 22, which is a simple idler pulley, the shafts are connected to operate various engine or vehicle accessories. For example, shaft 34 drives an engine water pump, shaft 36 an electrical alternator, shaft 38 an electromagnetic clutch of a compressor for an air-conditioning system for the automobile, and shaft 40 an oil pump of the power steering system.

It will be understood that the internal combustion engine 10 may be of any known construction. In accordance with conventional practice, the operation of the engine is such as to impart vibratory forces to the engine frame 12. All of the accessories are mounted on the engine frame 12 so that the shafts are rotated about parallel axes which are fixed with respect to the engine frame 12 and parallel with the output shaft 16 thereof. The belt 20 is tensioned by a belt tensioner, generally indicated at 42. The tensioner may be of any construction. However, a preferred embodiment is the tensioner disclosed in commonly assigned U.S. Pat. No. 4.473,362, the disclosure of which is hereby incorporated by reference into the present specification. As shown, the tensioner 42 includes an idler pulley 44 which is disposed in rolling engagement with the flat back surface of the belt 20, the pulley being spring biased to maintain a generally constant tension in the belt 20.

Figure 2:
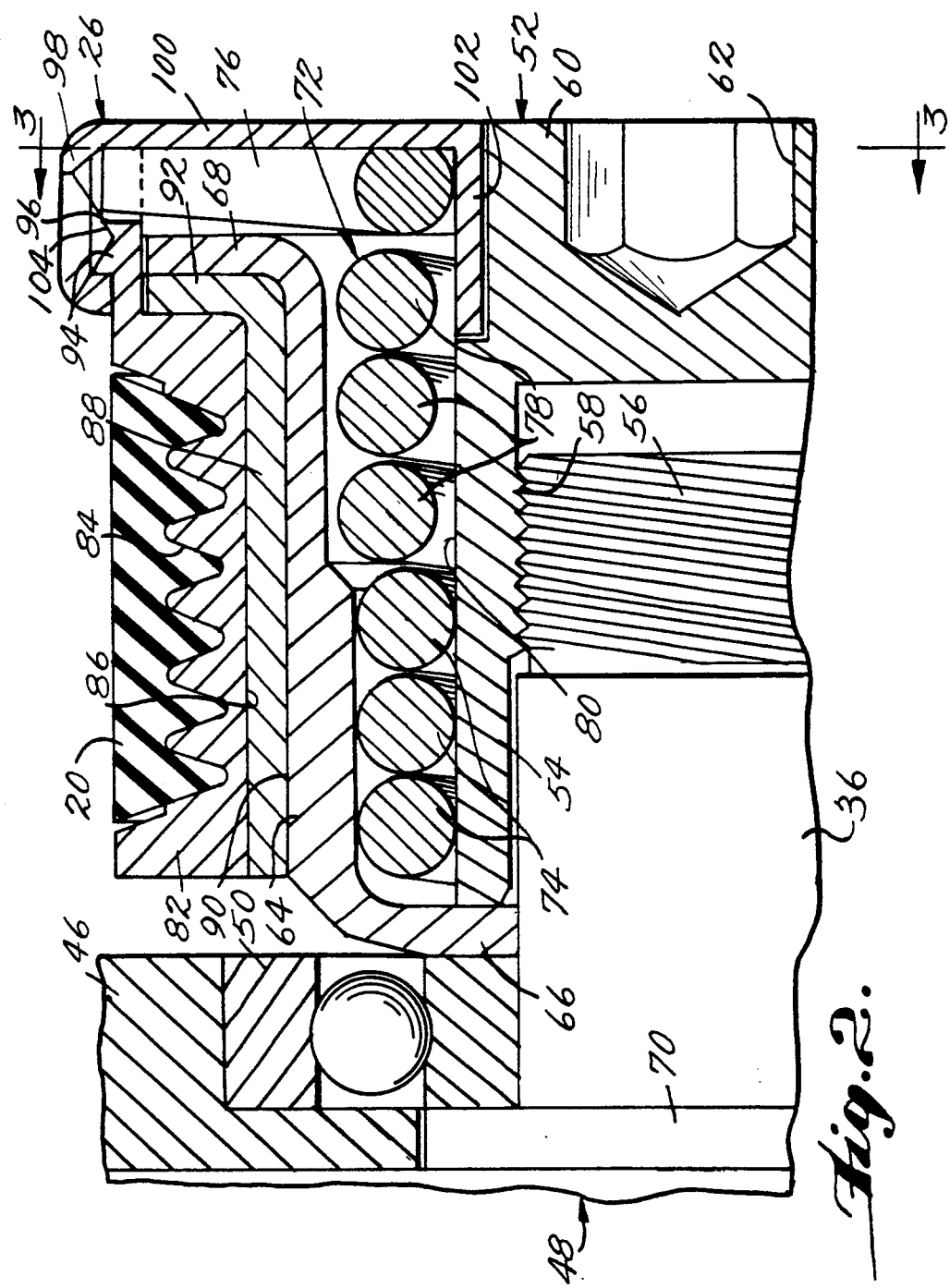
FIG. 2 is an enlarged fragmentary sectional view taken along the line 2—2 of FIG. 1.

The present invention is more particularly concerned with the functional connection between the pulley, generally indicated at 26, and the shaft 36 of the alternator. As best shown in FIG. 2, the alternator includes a housing 46 within which an armature assembly, generally indicated at 48, is journalled, as by bearings 50. As shown, shaft 36 forms a part of the armature assembly 48 and includes an end portion extending outwardly of the housing 46.

Fixed to the outwardly extending end of the shaft 36 is a hub structure, generally indicated at 52. As shown, the hub structure 52 includes an inner sleeve 54 which extends over the end of the shaft end portion 36. As shown, the extremity of the shaft 36 is threaded as indicated at 56 and the sleeve is formed with interior threads 58 which are disposed in meshing relation with the threads on the end of the shaft 36. The inner sleeve includes an end wall 60 which is formed with a hexagonal socket 62 for the purpose of receiving a tool for threadedly engaging the sleeve on the shaft threads 56.

The hub structure 52 also includes an outer sleeve 64 which includes a radially inwardly extending flange 66 on one end thereof and a radially outwardly extending flange 68 on an opposite end thereof. As shown in FIG. 2, the radially inwardly extending flange 66 extends between the inner race of the ball bearing 50 and the associated end surface of the inner sleeve 54. When the inner sleeve 54 is tightened on the end of the shaft 36, the tightening action serves to fixedly mount the inner race of the ball bearing against a flange 70 on the shaft 36 and to fixedly secure the hub structure 52 therewith including both the inner sleeve 54 and the outer sleeve 64.

In accordance with the principles of the present invention, the pulley 26 is connected with the hub structure 52 by a coil spring and one-way clutch mechanism, generally indicated at 72. The mechanism 72 is in the form of a generally helical coil of spring steel which includes a plurality of volutes 74 on one end thereof, a radially outwardly extending end portion 76 at the opposite end thereof and a plurality of intermediate volutes 78 between the first plurality of volutes 74 and the end portion 76. As shown, the inner sleeve has an exterior peripheral surface 80 which is of cylindrical configuration and the first plurality of volutes 74 of the mechanism 72 have an inner diameter dimension which allows the volutes 74 to engage the cylindrical surface 80 with a gripping action when the pulley 26 is being driven by the belt 20 of the serpentine drive system 18.

Figure 3:
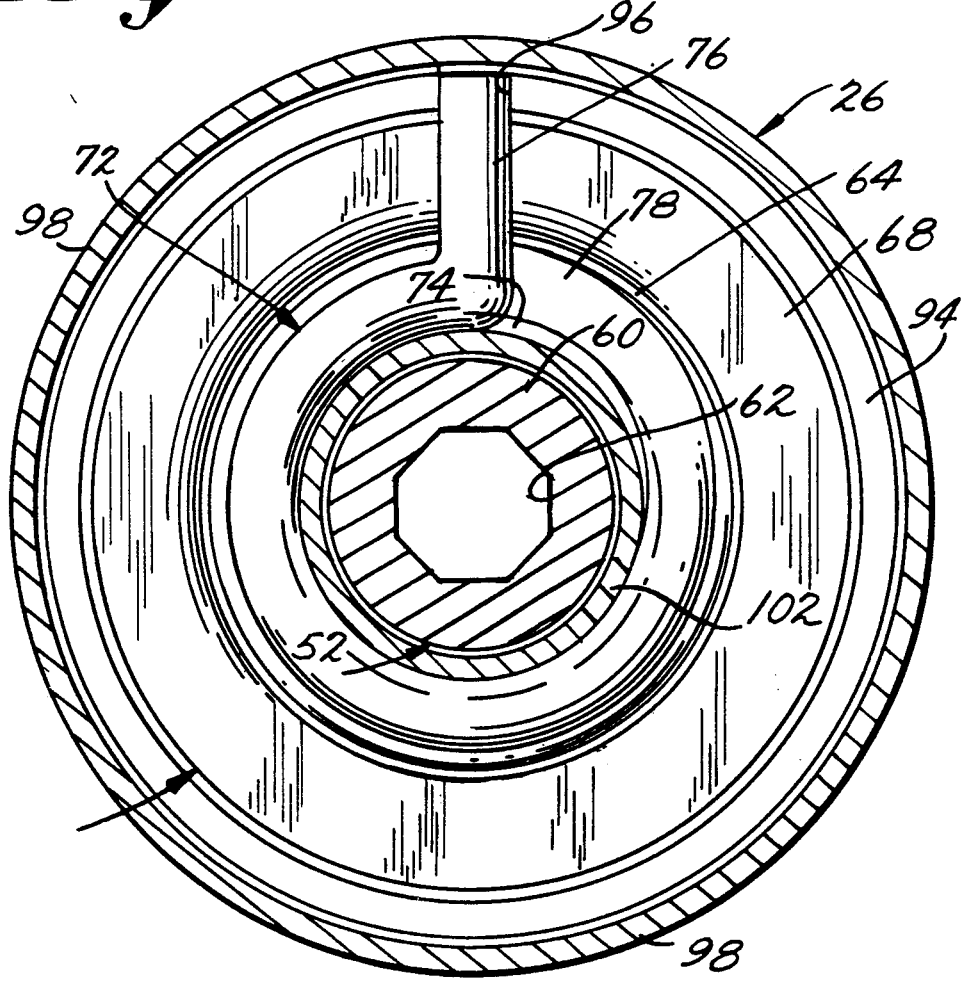
FIG. 3 is a reduced sectional view taken along the line 3—3 of FIG. 2.

As best shown in FIGS. 2 and 3, the pulley 26 includes an annular pulley member 52 having an exterior poly-V surface 84 for rollingly engaging the operative poly-V side of the serpentine belt 20. The annular pulley member 82 also includes an interior annular bearing surface 86 which is disposed in engagement with an annular sleeve bearing 88, the interior of which is engaged with an exterior surface 90 of the outer sleeve 64. As shown, the sleeve bearing 88 includes a radially outwardly extending annular flange 92 which provides an axial bearing surface between the outer flange 68 of the outer sleeve 64 and the adjacent surface of the pulley member 82.

The pulley member 82 has an annular flange 94 which extends axially from one end thereof beyond the outer flange 68 of the outer sleeve 64. As best shown in FIGS. 2 and 3, the axial flange 94 has a notch 96 therein within which the end portion 76 of the coil is seated. In this way, the pulley is connected in motion-transmitting relation to the mechanism.

The pulley 26 also includes a cover member 98 characterized by an outer annular wall engaging the exterior periphery of the axial flange 94. A free end of the outer wall is bent radially inwardly to effect securement of the cover member with the axial flange. The cover member also includes a radially inwardly extending wall 100 and an inner axially extending wall 102 which serve to encompass the associated end of the coil spring and one-way clutch mechanism 72. It will be noted that the remainder of the mechanism 72 is encompassed by the inner and outer sleeves of the hub structure 52. In FIG. 2, there is shown a drill cavity 104 which is formed in the periphery of the pulley 26 for purposes of providing an exact rotational balance therefor.

It will be understood that, as long as there is a positive torque acting on the pulley 26 by the movement of the belt 20, the coil spring and one-way clutch mechanism 72 will serve to transmit the movement imparted to the pulley 26 by the belt 20 to the hub structure 52. During this movement, the plurality of intermediate volutes 74 which are spaced between the inner and outer sleeves of the hub structure 52 enable the hub structure 52 and, hence, the armature fixed thereto to be capable of instantaneous relative resilient rotational movements in opposite directions with respect to the alternator pulley 26 during the driven rotational movement thereof. In addition, when the rotational speed of the engine output shaft 14 is decelerated to an extent sufficient to establish a torque between the alternator pulley 26 and the hub structure 52 at a predetermined negative level, as, for example, minus 50 inch-pounds, the first plurality of volutes 74 will engage the surface 80 with a slipping action enabling the hub structure 52 and, hence, the armature assembly 48 affixed thereto to rotate at a speed in excess of the rotational speed of the alternator pulley 26.

It will be understood that the minus 50 inch-pound torque level is exemplary only and that the negative torque level at which clutch slippage occurs is best chosen to fit the characteristics of the particular system. The system will vary depending upon the characteristics of (1) the engine; i.e., whether it is a "sporty" engine or a more conservative one which is computer controlled, and (2) the belt tension maintained by the belt tensioner of the system. An exemplary belt tension for the 50 inch-pound, 2½" diameter alternator pulley with 180° wrap is 70 pounds.

As shown in FIG. 1, it is desirable that the belt tensioner 42 operate on the belt 20 in the belt run leading to the alternator pulley 26. This enables the ability of the tensioner pulley 44 to move as the belt run is tensioned, due to a torque change to negative in the driving pulley 16, to accommodate to some extent the torque change between the belt 20 and the high inertial alternator pulley 26. Moreover, the resiliency of the intermediate volutes 78 of the coil spring and the one-way clutch mechanism 72 provides additional accommodation. It will be understood that the resilient characteristics of the coil spring and one-way clutch mechanism 72 are tuned to the particular drive system and more particularly to the particular characteristic of the engine of the drive system. The strength of the spring is determined by diameter dimension of the steel wire utilized to form the coil. Proper tuning is determined by the spring rate which is a function of the extent of the intermediate volutes 78 or the number of turns or volutes included therein. Desirably, the predetermined negative torque level at which clutch slippage occurs is a final back-up accommodation for torque variation to negative which will prevent belt slippage with respect to the alternator pulley 26 with an attendant undesirable noise.

It will be understood that the predetermined negative torque level at which clutch slippage occurs is chosen by choosing the difference between the relaxed interior diameter of the first plurality of volutes 74 and the exterior diameter of the cylindrical surface 80. The relationship is such that the exterior diameter of surface 80 is larger than the interior diameter of the volutes 74 so that the volutes are stressed during assembly. As the diameter difference is increased, the predetermined negative torque level is increased in a negative sense. Preferably, the predetermined negative level is chosen so that clutch slippage is minimized while insuring against belt-pulley slippage. In this way, the dual action of the coil spring and one-way clutch mechanism 72 supplements the action of the belt tensioner 42 to effectively prevent belt 20 pulley 26 slippage over a wide range of torque variation output and input, thus reducing noise and increasing belt life.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A serpentine belt drive system for an automotive vehicle comprising a drive assembly including an internal combustion engine having an output shaft with a driving pulley thereon rotatable about a driving pulley axis, a sequence of driven assemblies each having a driven pulley rotatable about an axis parallel with said driving pulley axis and a serpentine belt mounted in cooperating relation with said driving pulley and with said driven pulleys in a sequence which corresponds with the sequence of said driven assemblies when related to the direction of movement of the belt to cause said driven pulleys to rotate in response to the rotation of said driving pulley, said sequence of driven assemblies including an alternator assembly including a housing and an armature assembly mounted in said housing for rotation about an armature axis, a hub structure fixedly carried by said armature assembly outwardly of said housing for rotation therewith about the armature axis, means for mounting the driven alternator pulley of said alternator assembly on said hub structure for rotational movement with respect to said hub structure about the armature axis, and a coil spring and one-way clutch mechanism between said alternator pulley and said hub structure for (1) transmitting the driven rotational movements of said alternator pulley by said serpentine belt to said hub structure such that said armature assembly is rotated in the same direction as said alternator pulley while being capable of instantaneous relative resilient rotational movements in opposite directions with respect to said alternator pulley during the driven rotational movement thereof and (2) allowing said hub structure and hence the armature assembly to rotate at a speed in excess of the rotational speed of said alternator pulley when the speed of the engine output shaft is decelerated to an extent sufficient to establish the torque between said alternator pulley and said hub structure at a predetermined negative level.

2. A serpentine belt system as defined in claim 1 wherein said armature assembly includes a shaft having an end portion extending outwardly of said housing and fixed to said hub structure, said serpentine belt being relatively thin and flexible and including an operative side of poly-V cross-sectional configuration and an opposite flat side, said driven alternator assembly being disposed in sequence after an automatic belt tensioner assembly including a belt driven tensioner pulley having a smooth exterior periphery disposed in cooperating relation with the flat side of said serpentine belt.

3. A serpentine belt system as defined in claim 2 wherein said coil spring and one-way clutch mechanism includes a generally helical coil of spring steel having (1) a first plurality of volutes at one end thereof of an interior diameter to engage a cylindrical exterior surface on said hub structure with a gripping action when the torque between said alternator pulley and hub structure is at a level above said predetermined negative level and with a slipping action when the torque between said alternator pulley and said hub structure is at a level below said predetermined negative level, (2) an opposite end fixedly connected to said armature pulley, and (3) an intermediate plurality of volutes between the opposite end and the first plurality of volutes disposed out of engagement with said hub structure so as to resiliently expand and contract in response to the instantaneous relative rotational movements of said hub structure in opposite directions with respect to said alternator pulley during the driven rotational movement thereof.

4. A serpentine belt system as defined in claim 3 wherein said hub structure includes an inner sleeve threaded on and extending over the end portion of said armature shaft, said inner sleeve providing the exterior cylindrical surface engaged by said first plurality of volutes.

5. A serpentine belt system as defined in claim 4 wherein said hub structure includes an outer sleeve fixed to said inner sleeve and encompassing therewith said first plurality of volutes.

6. A serpentine belt system as defined in claim 5 wherein said alternator pulley includes an annular pulley member having an exterior poly-V surface for engagement by the operative side of said serpentine belt and an interior annular bearing surface, said armature pulley mounting means including a sleeve bearing on said outer sleeve engaging the interior annular bearing surface of said annular pulley member.

7. A serpentine belt system as defined in claim 6 wherein said outer sleeve includes a radially inwardly extending inner flange on one end thereof and a radially outwardly extending outer flange on an opposite end thereof, said bearing sleeve having an annular flange extending radially outwardly from an end thereof between said outer flange and said annular pulley member.

8. A serpentine belt system as defined in claim 7 wherein said annular pulley member includes an axially extending annular flange at one end thereof, said axial annular flange having a notch formed therein, said opposite end of said coil extending radially outwardly into said notch.

9. A serpentine belt system as defined in claim 8 wherein said pulley includes an annular cover member fixed over said axial annular flange and extending inwardly in enclosing relation with the opposite end of said coil.

10. A serpentine belt system as defined in claim 2 wherein said alternator pulley includes an annular pulley member having an exterior poly-V surface for engagement by the operative side of said serpentine belt and an interior annular bearing surface, said armature pulley mounting means including a sleeve bearing carried by said hub structure engaging the interior annular bearing surface of said annular pulley member.

11. A serpentine belt system as defined in claim 1 wherein said coil spring and one-way clutch mechanism includes a generally helical coil of spring steel having (1) a first plurality of volutes at one end thereof of an interior diameter to engage a cylindrical exterior surface on said hub structure with a gripping action when the torque between said alternator pulley and hub structure is at a level above said predetermined negative level and with a slipping action when the torque between said alternator pulley and said hub structure is at a level below said predetermined negative level, (2) an opposite end fixedly connected to said armature pulley, and (3) an intermediate plurality of volutes between the opposite end and the first plurality of volutes disposed out of engagement with said hub structure so as to resiliently expand and contract in response to the instantaneous relative rotational movements of said hub structure in opposite directions with respect to said alternator pulley during the driven rotational movement thereof.

12. A serpentine belt system as defined in claim 11 wherein said alternator pulley includes an annular pulley member having an axially extending annular flange at one end thereof, said axial annular flange having a notch formed therein, said opposite end of said coil extending radially outwardly into said notch.

13. A serpentine belt system as defined in claim 12 wherein said alternator pulley also includes an annular cover member fixed over said axial annular flange and extending inwardly in enclosing relation with the opposite end of said coil.

14. A serpentine belt system as defined in claim 11 wherein said hub structure includes an inner sleeve providing the exterior cylindrical surface engaged by said first plurality of volutes and an outer sleeve fixed to said inner sleeve and encompassing therewith said first plurality of volutes.

15. An alternator assembly for an automotive serpentine drive system including a belt comprising
a housing,
an armature assembly mounted in said housing for rotation about an armature axis,
a hub structure carried by said armature assembly outwardly of said housing for rotation therewith about the armature axis,
an alternator pulley mounted on said hub structure for rotational movement with respect to said hub structure about the armature axis,
said pulley having an exterior surface configuration suitable to be engaged by the belt so as to be driven rotationally thereby, and
a coil spring and one-way clutch mechanism between said alternator pulley and said hub structure for (1) transmitting the driven rotational movements of said alternator pulley by said serpentine belt to said hub structure such that said armature assembly is rotated in the same direction as said alternator pulley while being capable of instantaneous relative resilient rotational movements in opposite directions with respect to said alternator pulley during the driven rotational movement thereof and (2) allowing said hub structure and hence the armature assembly to rotate at a speed in excess of the rotational speed of said alternator pulley when the speed of the engine output shaft is decelerated to an extent sufficient to establish the torque between said alternator pulley and said hub structure at a predetermined negative level.

16. An alternator assembly as defined in claim 15 wherein said coil spring and one-way clutch mechanism includes a generally helical coil of spring steel having (1) a first plurality of volutes at one end thereof of an interior diameter to engage a cylindrical exterior surface on said hub structure with a gripping action when the torque between said alternator pulley and hub structure is at a level above said predetermined negative level and with a slipping action when the torque between said alternator pulley and said hub structure is at a level below said predetermined negative level, (2) an opposite end fixedly connected to said armature pulley, and (3) an intermediate plurality of volutes between the opposite end and the first plurality of volutes disposed out of engagement with said hub structure so as to resiliently expand and contract in response to the instantaneous relative rotational movements of said hub structure in opposite directions with respect to said alternator pulley during the driven rotational movement thereof.

* * * * *

UNITED STATES PATENT AND TRADEMARK OFFICE
CERTIFICATE OF CORRECTION

PATENT NO. : 5,156,573

DATED : October 20, 1992

INVENTOR(S) : Klaus K. Bytzek et al.

It is certified that error appears in the above-identified patent and that said Letters Patent is hereby corrected as shown below:

On the title page, item [54] and in column 1, line 3, in the title should read:

--SERPENTINE DRIVE WITH COIL SPRING-ONE-WAY CLUTCH

ALTERNATOR CONNECTION --

Signed and Sealed this

Sixteenth Day of November, 1993

Attest:

BRUCE LEHMAN

*Attesting Officer*       *Commissioner of Patents and Trademarks*